J. B. DYER.
FLOOR SURFACING MACHINE.
APPLICATION FILED MAY 1, 1908.
910,995.
Patented Jan. 26, 1909.
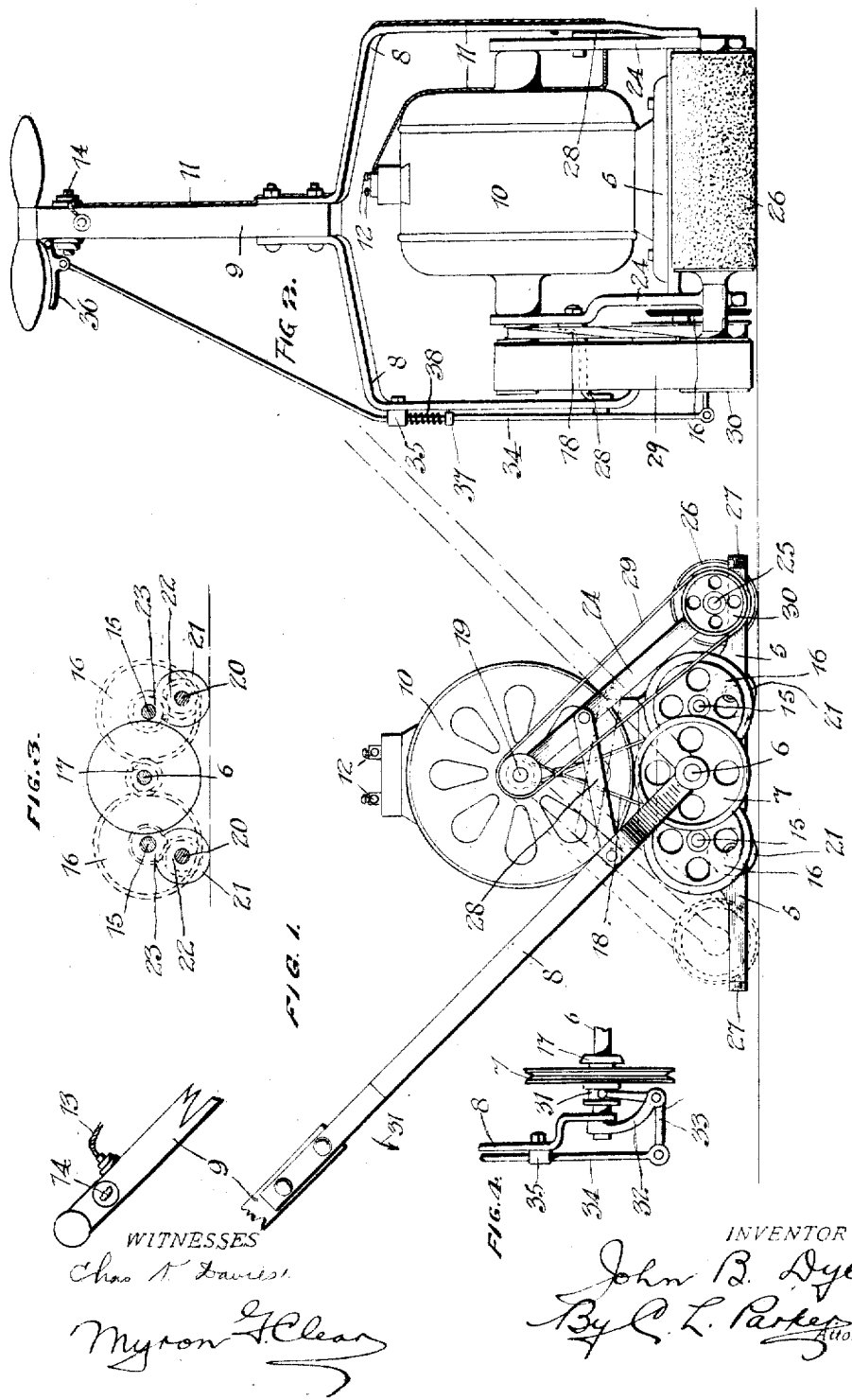
INVENTOR
John B. Dyer,
By C. L. Parker
Attorney
WITNESSES
Chas. N. Daviss
Myron F. Cleary

UNITED STATES PATENT OFFICE.

JOHN B. DYER, OF IRONTON, OHIO.

FLOOR-SURFACING MACHINE.

No. 910,995.

Specification of Letters Patent.

Patented Jan. 26, 1909.

Application filed May 1, 1908. Serial No. 430,423.

*To all whom it may concern:*

Be it known that I, JOHN B. DYER, a citizen of the United States, residing at Ironton, in the county of Lawrence and State of Ohio, have invented certain new and useful Improvements in Floor-Surfacing Machines, of which the following is a specification.

My invention relates to floor surfacing machines, and particularly contemplates the provision of a motor driven device of this character having means for reversing the direction of movement without turning the device around, and for maintaining the abrasion roller upwardly of the device in either direction of movement.

My invention further and specifically resides in the following features of construction, arrangement and operation, to be hereinafter described with reference to the accompanying drawings, forming a part of this specification, in which like numerals are used to designate like parts throughout the several figures, and in which, Figure 1 is a side elevation of my improved device. Fig. 2 is a front elevation thereof. Fig. 3 is a diagrammatic view of the gear connection for driving the propelling wheels, and, Fig. 4 is a fragmentary detailed elevation of the clutch mechanism.

In the practical embodiment of my invention, I provide a supporting frame 5, through which is mounted a centrally transverse shaft 6, carrying a pulley wheel 7 splined thereon and upon the outer ends of which are loosely mounted the ends of the U-shaped extensions 8 of the handle 9. Mounted upon the supporting frame 5, is a motor 10, supplied with current by wires 11 leading to binding post 12 thereon, from the upper portion of the handle 9, and connected with a lamp cord 13, or the like, through a reversing key switch 14, by which the direction of rotation of said motor is controlled. Mounted through the supporting frame 5, on either side of the central shaft 6, are shafts 15, carrying friction wheels 16, meshing with and driven by a small friction wheel 17, carried loosely upon said shaft 6, and secured to the pulley wheel 7, which wheel 7 is rotated by a twisted belt 18, driving the same from the shaft 19 of the motor 10. Mounted also through the supporting frame 5, adjacent the shafts 15, are propelling shafts 20, carrying rubber tired propelling wheels 21, and provided with gears 22 meshing with and rotated by the small gears 23 carried upon said shafts 15. These connections are more particularly shown in Fig. 3 from which it is seen that the apparatus will be moved along the floor to be surfaced, by the rollers 21 through the connections just described.

Mounted upon each side of the motor 10, with one of their ends loosely associated about the shaft 19, are a pair of pivotal arms 24, extending therefrom and having their outer ends loosely connected upon a transverse shaft 25 carrying a surfacing roller 26 between the forward extensions of the supporting frame 5, which extensions may be provided with rubber buffers 27. The surface roller 26, may be in the form of a sand drum or polishing roller, whichever is necessary for use upon the floor to be surfaced.
By reason of its pivotal supporting rod 24, loosely connected thereto and to the shaft 19 of the motor 10, the surfacing roller 26, is capable of rotation about said shaft 19, and upon the swinging movement of the handle 9, the extensions 8 of which have pivotal conecting links 28, extending from the same to said supporting arms 24, and when so moved as shown in dotted lines in Fig. 1, the apparatus is adapted for reverse movement without turning the same around, the movement in the reverse direction being effected by the reversal of switch 14, reversing the action of the motor 10, The surfacing roller 26 is driven from the shaft 19 of the motor 10 by a belt 29, extending therefrom and engaging a pulley wheel 30 mounted upon the shaft 25.

In order to stop the rotation of the propelling wheels 21 when it is desired to reverse the movement of the apparatus, I provide the pulley wheel 7 mounted upon the shaft 6 and having the small friction wheel 17 connected therewith, with a circumferential slotted sleeve 31, extending outwardly therefrom and surrounding the transverse shaft 6 from which said pulley wheel 7 is splined, as before described and on which said pulley wheel is therefore capable of sliding. Mounted with its end loosely associated about the extremity of the shaft 6 beyond the lower end of the extension 8 of the handle 9, and curved downwardly is a bracket arm 32 in the lower end of which is pivotally mounted a bell-crank lever 33, having the ends of its vertical extension engaging within the circumferential slot of the sleeve 31, whereby the vertical swinging movement of its horizontal arm will cause the slidable movement of the pulley wheels 7 upon the shaft 6 to engage or disengage its small friction wheel 17, with the friction wheels 16 carried upon the intermediate shafts 15. Pivotally connected to the extremity of the horizontal arm of said bell-crank lever, and extending upwardly along the extension 8 upon one side of the handle 9, to the upper end of said handle, is a longitudinal movable operating rod 34, operating through guides 35 upon said extension 8, and connected at its upper end to a point intermediate the ends with a lever 36 pivoted at one end to said handle 9 adjacent its upper end. Thus when the lever 36 is pressed upwardly to cause the longitudinal movement of the operating rod 34, the bell-crank lever 33 will be rotated upon its pivot to cause the frictional engagement of the wheels 17 and 16, said rod 34 being provided with a rigid collar 37 and with a coil spring 38 extending between said collar and one of said guides 35 of the extension 8 of the handle, to return a clutch mechanism to its normal unclutched position.

From the foregoing description, it will be readily seen that I provide a floor surfacing mechanism, the direction of movement of which may be readily and easily reversed without turning the apparatus around, and in which the surface roller 26 may be readily forced into closer engagement with the floor to be surfaced, by downward pressure upon the handle 9 in the direction indicated by the arrow 31 in Fig. 1, inasmuch as said handle 31 and the supporting arm 24 of said surfacing roller are approximately parallel with one another and connected by the pivotal link, 28.

Having fully described my invention, I claim:

1. In a floor surfacing machine of the character described, the combination with a supporting frame, a motor mounted thereon, having a central shaft projecting therefrom, a surfacing roller extending forwardly of said frame, supporting arms having their ends loosely mounted about said motor shaft and said surfacing roller, a belt connecting said surface roller with said motor shaft, a handle frame pivotally mounted adjacent said frame, and extending rearwardly thereof approximately parallel with said roller supporting arms, and pivotal connecting links extending between said handle frame and said roller supporting arms, whereby said roller may be forced into closer engagement with the surface of the floor by a downward pressure upon said handle, and whereby said roller may be rotated about said motor shaft to the opposite side of said motor upon the swinging movement of said handle frame, substantially as described.

2. In a floor surfacing machine of the character described, the combination of a supporting frame, propelling wheels carried thereby, a motor mounted upon said supporting frame and having a centrally projecting shaft, means for supplying the current to said motor, a reversing switch within said means, means for driving said propelling rollers from said motor shaft, a surfacing roller extending forwardly within said frame, and having a central shaft pivotal supporting arms connecting said motor shaft and said surfacing roller shaft, and loosely mounted thereabout, a belt connecting said motor shaft and said surfacing roller shaft for driving the latter, a handle frame pivotally mounted adjacent said supporting frame and extending rearwardly thereof, and pivotal connecting links extending between said handle frame and said roller supporting arms, whereby said surfacing roller may be rotated about said motor shaft upon the swinging movement of said handle frame, substantially as described.

3. In a floor surfacing machine of the character described, the combination of a supporting frame, propelling wheels carried thereby, a motor mounted upon said supporting frame and having a centrally projecting shaft, means for supplying a current to said motor, a reversing switch within said means, means for driving said propelling rollers from said motor shaft embodying a relatively slidable member, means for sliding said member to connect and disconnect said driving means, a surfacing roller mounted within said frame forwardly of said propelling wheels and having a central shaft, pivotal supporting arms connecting said motor shaft and said surfacing roller shaft, and loosely mounted thereabout, a belt connecting said motor shaft and said surfacing roller shaft for driving the latter, a handle frame pivotally mounted adjacent said supporting frame and extending rearwardly thereof, and pivotal connecting links extending between said handle frame and said roller supporting arms, whereby said surfacing roller may be rotated about said motor shaft upon the swinging movement of said handle frame, substantially as described.

In testimony whereof I affix my signature in presence of two witnesses.

JOHN B. DYER.

Witnesses:
A. W. ABELE,
ABBIE LAMBERT.